(No Model.)
F. M. GILBERT.
BIRD CAGE.
No. 436,475. Patented Sept. 16, 1890.
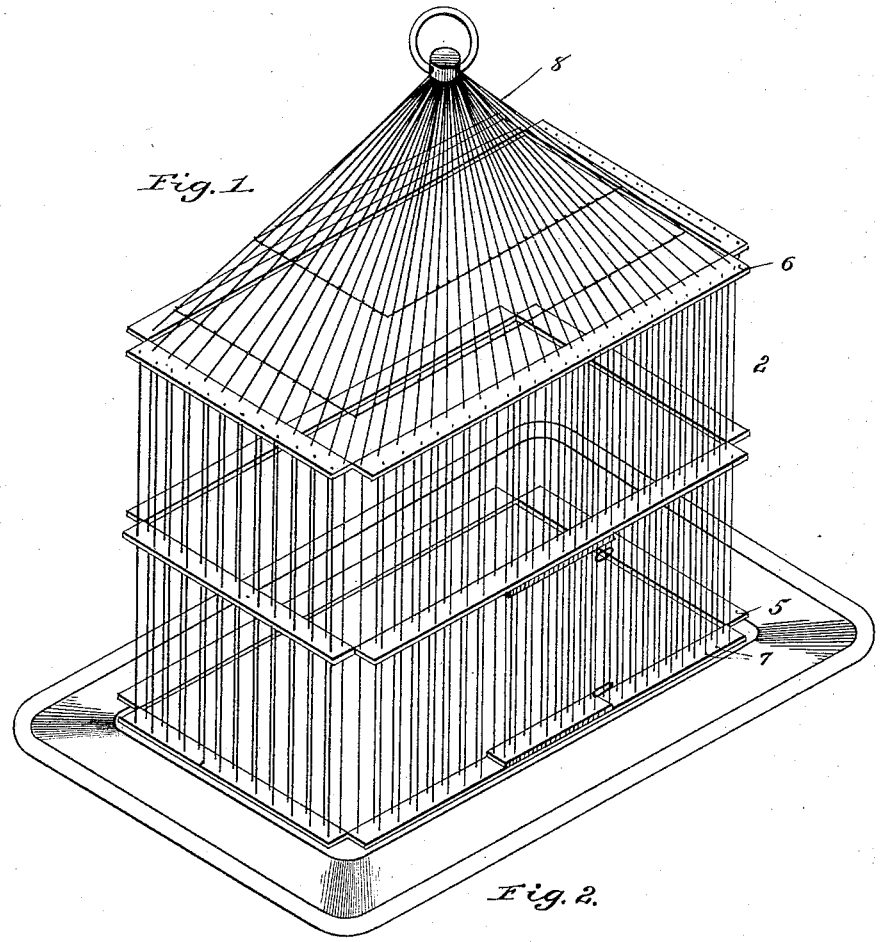
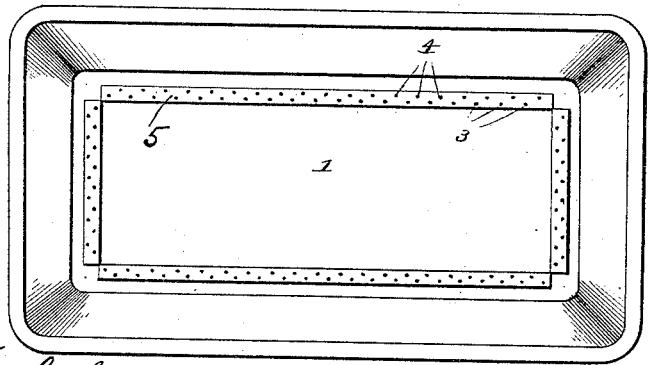
Witnesses
J. M. Fowler Jr.
H. J. Riley
Inventor
Frances M Gilbert
By his Attorneys.
C. A. Snow & Co.

UNITED STATES PATENT OFFICE.

FRANCIS M. GILBERT, OF SILVER CITY, TERRITORY OF NEW MEXICO.

BIRD-CAGE.

SPECIFICATION forming part of Letters Patent No. 436,475, dated September 16, 1890.

Application filed June 16, 1890. Serial No. 355,569. (No model.)

*To all whom it may concern:*

Be it known that I, FRANCIS M. GILBERT, a citizen of the United States, residing at Silver City, in the county of Grant and Territory of New Mexico, have invented a new and useful Bird-Cage, of which the following is a specification.

The invention relates to improvements in bird-cages.

The object of the present invention is to provide a simple, strong, durable, and inexpensive bird-cage, capable of protecting the inmates or confined birds from hawks or other birds of prey.

The invention consists in the construction and novel combination and arrangement of parts, hereinafter fully described, illustrated in the accompanying drawings, and pointed out in the claims hereto appended.

In the drawings, Figure 1 is a perspective view of a bird-cage constructed in accordance with this invention. Fig. 2 is a horizontal sectional view.

Referring to the accompanying drawings, 1 designates the bottom, upon which is secured a cage 2, that is removably attached to the bottom 1 in the usual manner. The cage 2 is composed of a double row or set of wires 3 and 4, which are arranged a suitable distance apart, and are separated by an intervening space 5, and are connected and supported by horizontal plates 6, which are arranged horizontally at the top and bottom of the vertical wires of the cage portion and at a point intermediate of their ends. The inner and outer rows 3 and 4 of wires pass through perforations 7 of the horizontal plates, and the inner row is arranged opposite the intervals of the outer row 4, and sufficient space separates the two rows to make it impossible for a bird of prey to injure the caged birds.

When a hawk or other bird of prey flies near a caged bird, the latter in fear and fright immediately clings to the wires and falls an easy victim to the bird of prey; but in cages constructed in accordance with this invention the outer wires securely prevent injury to the caged bird. The top 8 of the cage is constructed of finely-woven wire, and the door is constructed of two rows of wire similar to the adjacent portion of the cage; but the door may, if desired, be constructed of finely-woven wire, like the top 8. The cage is designed to be provided with the usual food-dishes, and the herein-described improvement may be readily applied to all forms of cages.

From the foregoing description and the accompanying drawings the construction, operation, and advantages of the invention will readily be understood.

What I claim is—

1. A bird-cage provided with the outer row of wires 4 and the inner row of wires 3, arranged opposite the intervals of the outer row and being separated from the outer row by the space 5, and the horizontal perforated plates connecting and supporting the rows of wires, substantially as described.

2. A bird-cage comprising the bottom, the outer row of wires 4, the inner row of wires 3, separated from the outer row by a space 5 and being arranged opposite the intervals of the outer row, the horizontal plates provided with perforations to receive the wires and being arranged at the top and bottom and at an intermediate point of the cage, and the finely-woven wire top 8, substantially as described.

In testimony that I claim the foregoing as my own, I have hereunto affixed my signature in presence of two witnesses.

FRANCIS M. GILBERT.

Witnesses:
E. B. CHASE,
F. JOHNSON.

It is hereby certified that the name of the patentee in Letters Patent No. 436,475, granted September 16, 1890, for an improvement in "Bird-Cages," was erroneously written and printed "Francis M. Gilbert," whereas said name should have been written and printed *Frances M. Gilbert;* and that said Letters Patent should be read with this correction therein that the same may conform to the record of the case in the Patent Office.

Signed, countersigned, and sealed this 18th day of November, A. D. 1890.

[SEAL.]
                        CYRUS BUSSEY,
                  *Assistant Secretary of the Interior.*

Countersigned:
    C. E. MITCHELL,
        *Commissioner of Patents.*